(12) United States Patent
Bourdelais et al.

(10) Patent No.: US 6,818,276 B2
(45) Date of Patent: Nov. 16, 2004

(54) LIGHT MANAGEMENT FILM WITH COLORANT RECEIVING LAYER

(75) Inventors: Robert P. Bourdelais, Pittsford, NY (US); Cheryl J. Kaminsky, Rochester, NY (US); Eric E. Arrington, Canandaigua, NY (US)

(73) Assignee: Eastman Kodak Company, Rochester, NY (US)

( * ) Notice: Subject to any disclaimer, the term of this patent is extended or adjusted under 35 U.S.C. 154(b) by 44 days.

(21) Appl. No.: 10/279,557

(22) Filed: Oct. 24, 2002

(65) Prior Publication Data

US 2004/0202822 A1 Oct. 14, 2004

(51) Int. Cl.[7] ............................................. B32B 3/30
(52) U.S. Cl. ...................... 428/141; 428/143; 428/156; 359/642; 359/707; 359/741
(58) Field of Search ................. 428/143, 141, 428/156; 353/31, 38; 359/443, 448, 452, 454, 455, 457, 459, 707, 619, 599, 741; 235/487, 462.05

(56) References Cited

U.S. PATENT DOCUMENTS

| | | | |
|---|---|---|---|
| 4,994,312 A | * | 2/1991 | Maier et al. ............... 428/36.5 |
| 5,361,163 A | * | 11/1994 | Matsuda et al. ............ 359/452 |
| 5,818,492 A | | 10/1998 | Look .......................... 347/171 |
| 6,246,428 B1 | | 6/2001 | Look et al. ................. 347/212 |
| 6,270,888 B1 | * | 8/2001 | Rutter et al. ................ 428/347 |
| 6,350,035 B1 | * | 2/2002 | Smith et al. ................ 359/530 |
| 6,583,936 B1 | * | 6/2003 | Kaminsky et al. .......... 359/619 |

OTHER PUBLICATIONS

R. P. Bourdelais, et al, "Light Diffuser with Variable Duffusion", USSN 10/147,703, (D–83948) filed May 16, 2002.

C. J. Kaminsky, et al, "Light Diffuser with Colored Variable Diffusion", USSN 10/147,659, (D–84407) filed May 16, 2002.

C. J. Kaminsky, et al., "Increased Contrast Overhead Projection Films", USSN 10/279,599, (D–84928) filed Oct. 24, 2002.

C. J. Kaminsky, et al., "Reflection Media for Scannable Information System", USSN 10/279,584, (D–84929) filed Oct. 24, 2002.

* cited by examiner

*Primary Examiner*—Harold Pyon
*Assistant Examiner*—Patricia L. Nordmeyer
(74) *Attorney, Agent, or Firm*—Arthur E. Kluegel

(57) ABSTRACT

Disclosed is a light management film containing a substrate, light shaping elements with a roughness average of at least 3 micrometers, and a layer capable of receiving a colorant density of at least 0.5.

36 Claims, 3 Drawing Sheets

LIGHT MANAGEMENT FILM WITH COLORANT RECEIVING LAYER

CROSS REFERENCE TO RELATED APPLICATIONS

This application is one of a group of three applications co-filed under U.S. Ser. Nos. 10/279,599; 10/279,557; and 10/279,557; all filed on Oct. 24, 2002, the contents of which are incorporated herein by reference.

FIELD OF THE INVENTION

The invention relates to a light management film. In a preferred form, the invention relates to a light management film with a layer capable of receiving a colorant density of at least 0.5 useful for use in a backlit display application or an overhead projection system.

BACKGROUND OF THE INVENTION

Current printing operations rely on flat media in which to print on. Thermal media producers go to great lengths to ensure that the thermal print media is flat. Thermal media needs to be flat to ensure even color density printing because the print head and paper must hit at the same point. As disclosed in U.S. Pat. No. 5,244,861, the thermal print media must have an average surface roughness of less than 0.2 micrometers or else there will be dropout. Dropout occurs when there are valleys or peaks in the thermal print media and the print head (because the thermal media is then closer or farther from the print head) so that a density differential occurs. If there is a valley in the thermal paper, less colorant will be transferred and it will show up as a light colored spot on the image.

Current light management films work by incorporating light shaping elements and typically have a surface roughness over 3 micrometers. It has been difficult to print over these light-shaping films to add color of high density.

Thermal printing is a term broadly used to describe several different families of technology for making an image on a substrate. Those technologies include hot stamping, direct thermal printing, dye diffusion printing and thermal dye sublimation printing. In order to use thermal dye sublimation printing on a non-compatible surface, the most common methods of improving print quality is to increase the thermal energy of the print head and to increase the pressure applied to the print head by the backup roll. However, increasing thermal energy and pressure can lead to decreased printer head life, ribbon wrinkling, lower print quality and mechanical stresses in the printing system.

It would be desirable to have a light management film that has excellent light shaping characteristics and is able to reproduce highly saturated colors. It would also be desirable to be able to color to monochromatic displays, such as LCD's for cell phones and personal digital assistants (PDAs) to create interesting static displays with coloration or personalization.

Prior art diffuser films with uniform diffusion across the film must have the diffusion efficiency to diffuse the most intense, specular areas of the display across the entire diffuser leading to high levels of diffusion efficiency causing lower percentages total transmission across the entire film. It would be desirable to have the amount of diffusion, light shaping, and color vary across the diffusion film, whether a bulk or surface diffuser, to compensate for uneven brightness across a backlit display.

Current overhead projection media typically consists of a transparent film with printing of some color and density. The projection film is placed on a light source where light is transmitted through the projection film and collected by the collection lens. The collection lens then projects the light to a projection screen. The projected image is much larger than the original projection film, making this system suitable for multiple viewers, as in a conference room or a classroom.

Because the bright white background of the projected image is bright, the viewers cannot easily view light colors printed on the transparency. In addition to the light coming from the overhead projector and comprising the image information, ambient light will be incident on the projection screen and reflected by this screen towards the audience. To obtain an image on the projection screen that is sufficiently rich in contrast during a presentation, at which illustrations, graphs and the like are shown by means of an overhead projector, the audience space will have to be darkened considerably. An increase of the power of the lamp in the illumination system, so that the signal light will be considerably more intense than the ambient light, causes heat build up in the lamp with causes early failure of the bulb or installation of a noisy fan. It would be advantageous to have a transparency film that could be projected with bright and dark areas with colors.

The current barcode system has a number of drawbacks. The typical black and white barcodes take up valuable packaging space and are unattractive. Where a packaging label is small (on a pack of chewing gum for example) the barcode might take up half of the label. Because the barcode takes of space and is unattractive, it is typically only placed in one part of the package. The operator of the barcode scanning system, for example a cashier at a grocery store, has to know where the barcode is on each package to quickly scan the item. If it is a new package design or a new item, the cashier might have to turn the package over a few times to find the barcode. It would be desirable to have a barcode system that could be placed in multiple areas of the package, without taking up addition space of the label, so it is more easily scanned.

Light diffusing elements that scatter or diffuse light generally function in one of two ways: (a) as a surface light diffusing element utilizing surface roughness to refract or scatter light in a number of directions; or (b) as a bulk light diffusing element flat outer surfaces and embedded light-scattering elements. The surface light diffusing elements normally utilize the rough surface, typically with a lens, exposed to air, affording the largest possible difference in index of refraction between the material of the diffuser and the surrounding medium and, consequently, the largest angular spread for incident light. The bulk diffuser diffuses the light within the film. Examples are small particles, spheres, or air voids of a particular refractive index are embedded another material with a differing refractive index. Light shaping elements tend to direct or deflect light using geometries and an index of refraction change. A prism is one example of a light shaping clement. Light shaping elements tend to be surface light shaping elements, though there are a few bulk light shaping elements. The geometry, materials, and environment determine how much light is shaped or directed by a light shaping element.

U.S. Pat. No. 4,774,224 describes using a resin-coated paper with a surface roughness measurement of 0.19 micrometers or less. This type of paper is generally used for photographic bases, and consequently, it has the photographic look. This base has excellent curl properties both before and after printing, and due to its simple design is relatively inexpensive to manufacture. However, it is not very conformable and under printing conditions with low pressure between a print head and a printer drum, it does not yield high uniformity prints (most commercial printers are now being built with low printing pressures to make them more cost effective). Also higher energy levels are needed to achieve a given density. It has been shown that typical resin coated paper cannot achieve high density because polyolefin, the polymer typically used in resin-coated paper, is not as good a thermal dye sublimation receiver as other polymers.

In U.S. Pat. No. 6,381,068 (Harada et al.), the diffusing element may be a bulk diffuser including a transparent base material and at least one light-diffusing material, such as a pigment and/or beads, dispersed in the transparent base material. The pigments used may include a white pigment (for example, titanium oxide) and may also include one or more colored pigments. The pigments in this invention are only used with a uniform diffuser and not a variable diffuser. Furthermore, the colored pigments must be a single color tone and density across the display.

In U.S. Pat. No. 6,266,476 (Shie et al.), a monolithic element comprises a substrate body and a macro-optical characteristic produced by surface micro-structures. These micro-structures can be non-uniform across the lens to minimize certain lens aberrations. These non-uniform micro-structures reduce lens aberrations, but are not able to significantly alter the macro-optical characteristics of the optical body. The diffusing structures, in this invention, vary so as to change the macro diffusion efficiency across the diffusion film.

U.S. Pat. No. 5,852,514 (Toshima et al.) describes a light diffusing element comprising a light diffusion layer including acrylic resin and spherical particles of polymethyl methacrylate on a transparent support. Whereas this film would diffuse the light efficiently, the polymers used have high glass transmission temperatures, and it would therefore be difficult to melt the spherical particles completely to create areas of specular transmission. When projected these not completely melted lenses would diffuse a portion of the light lowering the brightness of the printed, more specular, projected areas and thus lower contrast of the overhead projected image.

U.S. Pat. No. 3,763,779 (Plovan) discloses a method for copying an image by selectively coalescencing microporous voids in a voided film to create areas of transparency. The method has limitations in that to produce a copy in the voided film, an original must be used and the original must be of a particular material and format. It would be desirable to have a process to selectively coalesce voids using an electronic file as the template. The film has voids throughout the thickness of the film so that to make an area of the film transparent, the voids throughout the thickness of the film must all be coalesced or melted. This requires a substantial amount of energy making this method expensive, time consuming, and difficult.

U.S. Pat. No. 6,386,699 (Ylitalo et al.) discloses an embossed media for use as an inkjet receiver. This receiver could be part of a transparency media for overhead projection. The embossed surface is used to catch the inkjet materials and allow for drying time. The inkjet process does not change the structure of the embossed surface of the receiver media and would therefore transmit the projected image as all the same light intensity on the screen when lit by the overhead projection system.

U.S. Pat. No. 4,497,860 (Brady) discloses a method of using a linear prism array to project areas onto an overhead projection screen of high and low illumination. The method involves using a sheet with an ordered linear prism array on one side and heat to create non-refracting areas that show up as bright areas when projected. The light that passes through the still intact linear prism array is deflected away from the collection lens and is viewed as darker areas of illumination on the screen. By adding a diffraction grating and another linear prism array, the method can create colored images where the projected image can have at most two colors (one non-refracting area color and one refracting area color), for example, purple text on a green background. It would be desirable if more than two colors could be displayed by the overhead projection system at once. An undesirable aspect is that the process of molding the linear prism array must be very exact, leading the method to become cost prohibitive. A small difference in molding temperature or time yields vastly different qualities of projection media. In addition, when then linear prisms are melted, it the melting tool is not correctly aligned with the linear prism array, then some of the prisms will be melted partially distorting the projected image in color and density because the half-melted lens array will not deflect light correctly. A moiré pattern may be visible when the films are projected because of the use of an ordered surface pattern, especially when the one linear prism array is placed in conjunction with another linear prism array or diffraction grating. This moiré pattern is undesirable as it detracts from the projected material.

U.S. Pat. No. 5,369,419 (Stephenson et al.) describes a thermal printing system where the amount of gloss on a media can be altered. The method uses heat to change the surface properties of gelatin, which has many disadvantages. Gelatin can not achieve high roughness averages, thereby having a low distinction between the matte and glossy areas of the media. This small distinction between the matte and glossy states lead to a low signal to noise ratio and when projected, creates lower contrast ratios. Gelatin also is very delicate, scratch prone, is self-healing, tends to flow over time thus changing its surface roughness and other properties time especially in high humidity and heat, and is dissolved if placed in water. Also, gelatin has a native yellow color, is expensive, and is tacky sticking to other sheets and itself. It would be desirable to use a material that had no coloration, is more stable in environmental conditions, and could have a higher surface roughness.

U.S. Pat. No. 2,739,909 relates to a heat-sensitive recording paper by overcoating black-colored paper with a continuous thermoplastic resin material containing microscopic voids dispersed throughout the resin. The coating layer is opaque, but becomes transparent by the localized action of a stylus using either heat or pressure or both to disclose the black color of the support. There is a problem with this element in that the manner of obtaining the voids is complicated which involves carefully controlled drying conditions of emulsions leading to low yields and expensive end products.

U.S. Pat. No. 5,818,492 (Look) and U.S. Pat. No. 5,508,105 (Orensteen et al.) teach that thermal mass transfer printing can be performed on retroreflective sheeting in those instances where there is a polymeric layer or layers disposed thereon. While adding a polymeric layer has improved printability on some retroreflective sheeting, the process of adding the layer increases the cost of the final product and can degrade the retroreflective properties of the substrate. Even with the additional layer, the print quality is inadequate for some graphics applications. Adding a printable layer may alter other characteristics of the retroreflective sheeting, such as frangibility.

U.S. Pat. No. 6,246,428 (Look) describes a method and apparatus for preheating the dye receiving layer to a certain temperature, in order to increase the thermal energy of the substrate surface to improve print quality at low print head thermal energy and pressure in a thermal mass transfer printing system. The method is suitable for webs that have a non-planar printing surface, such as unsealed retroreflective sheeting, and non-homogeneous thermal conductive, such as a seal or unsealed retroreflective sheeting. This method of printing light management films requires extra heat in the thermal printer (one or more depending on the configuration) leading to higher cost and energy usage. Furthermore, the large installed base of the thermal printers would need to be retrofitted, which would be cost prohibitive. It would be desirable to print light management films without changing the thermal printer configuration.

U.S. Pat. Nos. 5,302,574 (Lawerance et al.) and 5,387,571 (Daly) describe thermal dye receiving layers that can achieve dye densities of over 0.5, but the dye receiving layer is smooth having virtually no light management characteristics.

PROBLEM TO BE SOLVED BY THE INVENTION

There remains a need for an improved light management film to provide light shaping characteristics and high color replication.

SUMMARY OF THE INVENTION

The invention provides a light management film containing a substrate, light shaping elements with a roughness average of at least 3 micrometers, and a layer capable of receiving a colorant density of at least 0.5.

ADVANTAGEOUS EFFECT OF THE INVENTION

The invention provides improved light management media to shape light as well as have high saturated color.

DETAILED DESCRIPTION OF THE INVENTION

Figure 1:
FIG. 1 illustrates a cross section of a light management film that comprises a substrate, light shaping elements and a layer capable of receiving a colorant density of at least 0.5.

The invention has numerous advantages over prior practices in the art. The light management film can shape light and reproduce highly saturated colors. When printing, the light shaping characteristics of the light management film can also be altered.

The light management film's light shaping characteristics can vary across the film surface, tailoring the light transmission, diffusion, shaping, and color as a function of position on the film. The colored variable diffusion film can be designed to the light source and the display. The colored variable diffusion film evens out the color and illumination of the backlight across the display using a gradient in color tone, color density, and diffusivity. For a display with the light source in the center of the display, the percent total light transmission would increase and diffuse light transmission would decrease from the center of the roll to the edge of the roll. The film would be more diffuse and less transparent in the center of the display where the light is located, to compensate for the light intensity of the light bulb. Towards the edge of the film and display, away from the light source, more light passes through the film and the light is diffused less to create an even light intensity across the entire display. Selective coloration of the variable diffuser creates an even color tone across the display by using higher density color close to the light source and lower color density away from the light to create an even color across the display.

The light management film can have a high transmission rate for light diffusers and shapers, which is particularly important for liquid crystal display devices as a high transmission value allows the liquid crystal display to be brighter or holding the level of brightness the same, allows for the power consumption for the back light to be reduced. This extends the lifetime of battery powered liquid crystal devices that are common for note book computers. The invention can also be easily changed to achieve the desired light shaping, light shaping variation, and light transmission requirements for many liquid crystal devices and other display applications thus allowing the invention materials to be responsive to the rapidly changing product requirements in the liquid crystal display market. Further, the light management film with efficiency variation can create patterns, text, and pictures by shaping light selectively.

Color can be applied by any method, for example inkjet, flexo printing, gravure printing, screen printing, electrophotography, and thermal printing (including thermal dye sublimation). The coloration techniques can apply heat and pressure to change the characteristics of the light shaping film, or not apply heat and pressure and apply to a light shaping film with variable light shaping efficiency.

Color can be introduced into a static monochromatic display. Color to a monochromatic display can increase its value to the consumer. In a cell phone, for instance, the light management film could be printed so that the number dialed was always green and the battery indicator was always red. This invention can also be used for branding. Names or pictures could be added to a cell phone for added security against theft because the thief would have to dismantle the entire display to get at the light management film most likely breaking it. The light management film adds color to a display without adding another film to the display stack (which adds weight and cost) because color is added to a light management film already in the stack (such as a diffuser, brightness enhancement film, or reflective film).

Using light diffusing elements (one subset of light shaping elements) that are flatted with to heat and/or pressure, a high contrast projected image can be obtained where the printed areas (flattened light diffusing elements), are bright and the non-imaged areas are dark. This increased contrast between the printed and non-printed areas allows the overhead projected image to be easily viewed without having to dim the ambient lighting. Not only can the imaged areas be bright, but they can also be colored producing projected images of text, images, shapes, and pictures with many colors on a darkened background. Furthermore, lighter colors that were unable to be projected before such as yellow, pink, and light blue because they were projected against a brightly illuminated white background can now be displayed because the background un-printed areas are dark gray.

The process for projecting a printed projection media with areas of specula and diffuse transmission comprises having a light source that transmits light through the projection media. The light transmitted through the projection media in the specular areas will be collected by a collection lens will be projected to the projection screen as a bright area. A percentage of the light that passes through the un-printed areas (diffuse areas) will be deflected from the collection lenses and appear as a darker area on the projection screen. How dark the area appears is related to how much light is diffused by the diffusing elements. If the diffusing elements do not diffuse the light much, the collection lenses will collect more light and the projected area would not be as dark as a projection media with high diffusion light diffusing elements would.

The difference in gloss between the matte and glossy areas once the light management film has been printed can be large making it visually readable for indicia or other display materials. Using a reflection media in a barcode, with matte and glossy areas, allows for easy readability by a barcode reading system. Because the barcode is not a large black and white printed area, it saves space on a label and makes the appearance of the package more attractive. Furthermore, using differential surface gloss, a barcode can be created that is clear so that it can be placed over existing images and information and be placed in several places on the package. The reflection media of the present invention can display text, shapes, and images in varying amounts of gloss and different colors surrounded by diffuse, matte regions to create visually interesting and easily readable labels and media. The glossy/matte reflective media can also be used to create indicia, like a watermark, or a security feature.

Furthermore, with the correct choice of polymers and substrates, the light management film of the invention can be printed using standard thermal printing systems available today. This enables a new form of light management films that can be easily plugged into standard overhead printing and displaying systems.

The diffusion film of the present invention can be produced by using a conventional film-manufacturing facility in high productivity using roll to roll manufacturing processes. These and other advantages will be apparent from the detailed description below.

The term "LCD" means any rear projection display device that utilizes liquid crystals to form the image. The term "diffuser" means any material that is able to diffuse specular light (light with a primary direction) to a diffuse light (light with random light direction). The term "light diffusion elements" means any element that is able to diffuse specular light (light with a primary direction) to a diffuse light (light with random light direction). The term "light" means visible light. The term "diffuse light transmission" means the percent diffusely transmitted light at 500 nm as compared to the total amount of light at 500 nm of the light source. The term "total light transmission" means percentage light transmitted through the sample at 500 nm as compared to the total amount of light at 500 nm of the light source. This includes both spectral and diffuse transmission of light. The term "diffusion efficiency" and "haze" means the ratio of % diffuse transmitted light at 500 nm to % total transmitted light at 500 nm multiplied by a factor of 100. "Transparent" means a film with total light transmission of 80% or greater at 500 nm. The term "light shaping efficiency" means the percent of light is shaped or directed compared to the amount of light that strikes the surface of the light shaping element.

The term "light shaping element" means any structure that directs light as it passes through or reflects off of it. For example, a prism structure that collimates light or a diffuser that directs light out in a random direction are light shaping elements. The light directing or deflection can be at the micro or macro level. The matte and glossy areas of the film refer to the surface reflectivity characteristics of the side of the film that light is incident on. "Matte" means that light is reflected off the surface of the film diffusely. An example of a matte surface would be a plastic film with a roughened surface. "Glossy" means that light is reflected off of the surface of the film specularly. An example of a glossy surface would be a smooth plastic film. Roughness average means the average peak to valley measurement of the light shaping elements.

The term "polymeric film" means a film comprising polymers. The term "polymer" means homo- and co-polymers. The term "average", with respect to lens size and frequency, means the arithmetic mean over the entire film surface area. "In any direction", with respect to lenslet arrangement on a film, means any direction in the x and y plane. The term "pattern" means any predetermined arrangement whether regular or random. The term "microbead" means polymeric spheres typically synthesized using the limited coalescence process. The term "substantially circular" means indicates a geometrical shape where the major axis is no more than two times the minor axis. "Macro diffusion efficiency variation" means a diffusion efficiency variation that is greater than 5% between two locations that are separated by at least 2 cm. "Macro light shaping efficiency variation" means a light shaping efficiency variation that is greater than 5% between two locations that are separated by at least 2 cm. An optical gradient is a change in optical properties such as transmission, reflection, and light direction as a function of distance from a stating point. Usefully examples of an optical gradient include a light transmission gradient, a light diffusion gradient and light adsorption gradient. "Gradient", in reference to diffusion, means the gradual increasing or decreasing of diffusion efficiency relative to distance from a starting point.

In one embodiment of the invention, the diffusion film has a textured surface on at least one side, in the form of a plurality of random microlenses, or lenslets. The term "lenslet" means a small lens, but for the purposes of the present discussion, the terms lens and lenslet may be taken to be the same. The lenslets overlap to form complex lenses. "Complex lenses" means a major lens having on the surface thereof multiple minor lenses. "Major lenses" mean larger lenslets that the minor lenses are formed randomly on top of. "Minor lenses" mean lenses smaller than the major lenses that are formed on the major lenses. The term "concave" means curved like the surface of a sphere with the exterior surface of the sphere closest to the surface of the film. The term "convex" means curved like the surface of a sphere with the interior surface of the sphere closest to the surface of the film.

The "specular area" of the printed projection media is defined as where most of the light passing through that area of the media is transmitted specularly (not diffused). The haze value of light transmitted through this area is typically less than 30%. The "diffuse area" of the printed projection media is defined as where most of the light passing through that area of the media is diffusely transmitted. The haze value of light transmitted through this area is typically greater than 70%. "Printed projection media" in reference to the projection media means the projection media after it has been subjected to heat and/or pressure to partially or fully melt the light diffusing elements.

The surface of each lenslet is a locally spherical segment, which acts as a miniature lens to alter the ray path of energy passing through the lens. The shape of each lenslet is "semi-spherical" meaning that the surface of each lenslet is a sector of a sphere, but not necessarily a hemisphere. Its curved surface has a radius of curvature as measured relative to a first axis (x) parallel to the transparent polymeric film and a radius of curvature relative to second axis (y) parallel to the transparent polymeric film and orthogonal to the first axis (x). The lenses in an array film need not have equal dimensions in the x and y directions. The dimensions of the lenses, for example length in the x or y direction, are generally significantly smaller than a length or width of the film. "Height/Diameter ratio" means the ratio of the height of the complex lens to the diameter of the complex lens. "Diameter" means the largest dimension of the complex lenses in the x and y plane. The value of the height/diameter ratio is one of the main causes of the amount of light spreading, or diffusion that each complex lens creates. A small height/diameter ratio indicates that the diameter is much greater than the height of the lens creating a flatter, wider complex lens. A larger height/diameter value indicates a taller, skinner complex lens.

The divergence of light through the lens may be termed "asymmetric", which means that the divergence in the horizontal direction is different from the divergence in the vertical direction. The divergence curve is asymmetric, meaning that the direction of the peak light transmission is not along the direction θ=0°, but is in a direction non-normal to the surface. "Void" is used herein to mean devoid of added solid and liquid matter, although it is likely the "voids" contain gas.

If the roughness of the light shaping elements is less than 2 micrometers than the light shaping elements can not shape light as effectively.

Preferably, the average peak to valley height is greater than 6 micrometers. It has been shown that when the diffusion elements are on average 6 micrometers or taller, the light shaping elements are able to shape light very efficiently.

If the layer capable of receiving colorant density, also known as the dye receiving layer (DRL) in the case of a dye, is only capable of receiving dye density of less than 0.3, then the light management film would not be able to produce saturated and true colors. It would also reduce the ability of the light management film to replicate the Pantone® color space. Preferably, the layer capable of receiving colorant can receive densities of at least 1.5. It has been shown that a DRL that can receive a dye density of at least 1.5 can replicate a large portion of the Pantone® color space and create true and saturated colors. A DRL is preferred so that the coloration is transferred efficiently and mordanted into the light management film. The DRL must be compatible with the colorant with which it will be imaged so as to yield the desirable color gamut and density. The DRL can be, for example, a thermal dye receiving layer, an inkjet receiving layer, a toner receiving layer, etc.

Preferably, the light shaping elements are located between the substrate and the DRL that can receive a density of at least 0.5. This enables the light shaping elements to be independent of thereceiving layer. The receiving layer can be thin and follow the surface topography of the light shaping elements, or can be substantially thick to smooth out the surface of the light management film. This also enables the light shaping elements to be made of a multitude of materials. Softer materials could be used because the receiving layer will protect the light shaping elements from abrasion.

The light shaping elements preferably have an average aspect ratio of 0. 1 to 1.0. When the aspect ratio of the light shaping elements is less than 0.7, the amount of curvature is too low to sufficiently shape the light in transmission or reflection. In the case of a projection media, having low aspect ratio light shaping features would lead to low contrast of the projected image. The areas of the displayed projection film that were non-imaged and supposed to be dark, would be lighter because the diffusion elements would not direct the light away from the collection lens. When the aspect ratio of the diffusion elements is greater than 2.0, it becomes difficult to fully flatten the shaping elements and the printed and flattened areas would not be completely transparent. This leads to dimmer bright areas when projected, lowering the contrast between the printed and un-printed areas in the projected image.

The light shaping elements containing titanium dioxide particles less than 30 nanometers are preferred because of added strength to the light management film without significantly changing the transmission or diffusion characteristics of the light management film. Adding strength and stiffness to the light management film is important for transport through a printing system and handling. In small addition quantities, the addition of nano-$TiO_2$ does not affect the transmission or light shaping characteristics significantly is because the particles are below the wavelength of light and therefore do not scatter light.

When the light shaping elements have a glass transition temperature of over 82 degrees Celsius it becomes difficult to melt the lenses quickly and it takes more energy to melt the elements. If the high heat and time is not applied to the elements (which increases the printing cost of the media significantly), then the elements do not fully melt and retain some of the light shaping characteristics of the original light shaping elements. When projected, the not-fully melted elements will deflect some of the light away from the collection lens as it passes through the film and the projected "bright" areas will not be as bright. This makes colors (if they are added to the printed areas) less saturated and have less chroma and the projected image will lack contrast between the printed and un-printed areas resulting in an unpleasing image to the viewer and ambient lighting may have to be dimmed to compensate for the lower contrast. Furthermore, in a liquid crystal display, of the light shaping elements are not fully flattened then the light from the backlight may not be directed as efficiently leading to a darker display or shorter battery life.

Having the diffusing elements with a glass transition temperature of less than 75° C. is preferred. It has been shown that less than when a the diffsion lenses have a Tg of less than 75° C. very efficient melting occurs when printing, the dye or other colorant transfers well from the donor to the light management film, and the areas printed are fully melted to form transparent areas with very low haze values.

The light shaping elements comprising an UV curable polymer is preferred. The UV curable polymer would begin as an uncured polymer with light shaping elements. The light management film would be subjected to heat and/or pressure making areas of specular transmission and light shaping. The sheet would then be cured making it mostly invariable to heat and/or pressure. The resulting printed sheet would have areas of specular transmission and light shaping permanently. The sheet would be hard and durable to resist scratching. Using a UV polymer system adds a security feature to the overhead projection media or in a display system in that the film can not be written again once the film has been cured.

The light shaping elements preferably comprise an UV fluorescing agent. The fluorescing agent takes the light the UV and emits light in the visible region. This is one way to increase brightness in a backlit display, instead of absorbing the UV light from the backlight source, the fluorescing agent converts the UV light into visible light. It also gives the light management film an interesting look by having a film that glows under UV lighting or has a decay such that the fluorescing agents continue to fluoresce after exposure to UV light making it glow in the dark.

The light shaping elements preferably comprise a colorant. This would provide a simple projection media that is projected as one color on a background of gray. Projection media typically use light diffusion elements to scatter the light away from the collection lens. No matter what color the non-printed diffuse or light diffusion areas are, the diffuse areas appear dark because most of the light that passes through the diffuse areas is mostly directed away from the collecting lens. This is advantaged because there would be no need to transfer dyes when the light diffusing elements, in the case of projection media, are altered. For example, a page of text could be printed on a projection media that has a blue coloration to it. When projected the image will have a dark gray background surrounding blue text. More preferably, the polymer layer comprises dye or pigment. Pigment and dye have excellent color reproduction and color stability. Adding dyes and pigments to the light shaping elements can add color to imaged display media or can be used to color correct the backlight of the backlit display. The color added would be tailored to the light source to make it neutral so that the backlit display would be able to display more true colors. They are able to create a large color gamut and saturation. Furthermore, they are easily incorporated into extrusions and coatings of the polymer layer. Nano-sized pigments can also be used, with the advantage that less of the pigment is needed to achieve the same color saturation because the pigment particles are so small they are more efficient at adding color.

The light management film preferably has a haze value of at least 70%. This amount of haze is needed for a projection media to sufficiently deflect the light away from the collecting lens and make the diffuse areas project as dark areas. If the projection media has a haze value of less than 60%, then a percentage of the light transmitted through the projection media would not be deflected from the collection lens resulting in lighter dark areas. The smaller difference between the lighter dark areas and the printed bright areas would cause contrast to be less and make the projected image more difficult to view. For other light management film applications, 70% haze allows for efficient light shaping.

Preferably the projection media comprises a transparent substrate. The substrate provides dimensional stability to the projection media as well as stiffness, thickness to make it well suited to the system for printing the projection media. It is preferable to be transparent to project as much light through the specular parts so have increased contrast between the printed and non-printed areas. Most preferably, the substrate has a light transmission of at least 85%. It has been shown that a substrate with at least 85% light transmission has an acceptable level of contrast between the printed and non-printed areas of the projected image. An 85% transmission of the substrate allows an LC device to have improved battery life and increased screen brightness. The most preferred percent transmission of the substrate is at least 92%. A transmission of 92% allows diffusion of the back light source and maximizes the brightness of the LC device significant improving the image quality of an LC device for outdoor use where the LC screen must compete with natural sunlight.

The light management film preferably has a pressure sensitive adhesive. The pressure sensitive adhesive can be permanent or repositionable. The pressure sensitive adhesive is used to adhere the film onto an object, such as an ID badge, display component or other film. The adhesive preferably is coated or applied to the substrate. A preferred pressure sensitive adhesive is an acrylic-based adhesive. Acrylic adhesives have been shown to provide an excellent bond between plastics. The preferred adhesive materials may be applied using a variety of methods known in the art to produce thin, consistent adhesive coatings. Examples include gravure coating, rod coating, reverse roll coating and hopper coating.

Pressure sensitive labels applied are applied to packages to build brand awareness, show the contents of the package, convey a quality message regarding the contents of a package, and supply consumer information such as directions on product use, or an ingredient listing of the contents. The light management film is adhered (by glue, pressure sensitive adhesive, etc) to a package to form a label. The three types of information applied to a label are text graphic, and images. The packaging materials of the invention may provide a variety of packing materials that are labeling of packages such as bottles, cans, stand-up pouches, boxes, and bags. In display media, pressure sensitive adhesives are used to adhere optical films to a waveguide, polarizer, or other films. This reduces the chance that the optical film with slip around the device or bow causing optical defects. It also makes assembly by the display manufacturers simpler.

A preferred liner material or peelable back is an oriented sheet of polymer. The liner preferably is an oriented polymer because of the strength and toughness developed in the orientation process and the low amount of dust and lint that could be introduced if a paper liner is used. Preferred polymers for the liner substrate include polyolefins, polyester and nylon. Preferred polyolefin polymers include polypropylene, polyethylene, polymethylpentene, polystyrene, polybutylene, and mixtures thereof. Polyolefin copolymers, including copolymers of propylene and ethylene such as hexene, butene, and octene are also useful. Polyester is most preferred, as it is has desirable strength and toughness properties required for efficient transport of labels or optical films liner in high speed labeling equipment.

The contrast ratio preferred of the projected light management film, when projected, is 250:1. This means that the brightest areas are 250 times as bright as the dark areas. The amount of contrast below 200:1 is undesirable and it could become necessary to dim the ambient lighting to more easily see the projected image.

The light management film preferably comprises specular areas of transmission. These areas will display as bright areas against a darker background (non-printed areas) when projected by an overhead projection system. Preferably, color is added to the areas of specular transmission. When printing the projection media and creating areas of specular transmission, color can be added so that when projected the specular areas are colored. Multiple colors can be added to each sheet enabling an interesting and appealing display material. Furthermore, color is easily added at the same time the specular areas are created using dyes that sublimate and a thermal printer. This is advantaged because there are no registration issues between the areas of color (dye sublimation) and the areas of specular transmission because they are created at the same time using a printing technique that is inexpensive and already supported by the printing industry. The color added is preferably a dye because dyes are transparent so the colored areas show up bright and colored when projected, increasing the contrast between the printed and non-printed areas.

Preferably, the light shaping elements can receive a dye density of at least 0.5. This enables the light shaping elements to be printed on directly to create light management films with a surface texture and coloration. The light shaping elements may receive dye density without changing shape, or can partially or fully collapse to create areas of specular reflection or transmission. When the light shaping elements have dye receiving capabilities there is no need for a separate DRL and therefore an additional layer and possibly a manufacturing operation such as coating is eliminated.

Preferably the light shaping elements comprise a polymer. Polymers are easily processed, generally inexpensive, and can be manufactured roll to roll, tear resistant, and have excellent conformability, good chemical resistance and high in strength. Polymers are preferred, as they are strong and flexible. Polymers are preferred as they are generally lower in cost compared to glass surface features, have excellent optical properties and can be efficiently formed into lenses utilizing known processes such as melt extrusion, vacuum forming and injection molding. Preferred polymers for the formation of the complex lenses include polyolefins, polyesters, polyamides, polycarbonates, cellulosic esters, polystyrene, polyvinyl resins, polysulfonamides, polyethers, polyimides, polyvinylidene fluoride, polyurethanes, polyphenylenesulfides, polytetrafluoroethylene, polyacetals, polysulfonates, polyester ionomers, and polyolefin ionomers. Copolymers and/or mixtures of these polymers to improve mechanical or optical properties can be used. Preferred polyamides for the transparent complex lenses include nylon 6, nylon 66, and mixtures thereof. Copolymers of polyamides are also suitable continuous phase polymers. An example of a useful polycarbonate is bisphenol-A polycarbonate. Cellulosic esters suitable for use as the continuous phase polymer of the complex lenses include cellulose nitrate, cellulose triacetate, cellulose diacetate, cellulose acetate propionate, cellulose acetate butyrate, and mixtures or copolymers thereof. Preferably, polyvinyl resins include polyvinyl chloride, poly(vinyl acetal), and mixtures thereof. Copolymers of vinyl resins can also be utilized. Preferred polyesters for the complex lens of the invention include those produced from aromatic, aliphatic or cycloaliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoisophthalic and mixtures thereof. Examples of suitable glycols include ethylene glycol, propylene glycol, butanediol, pentanediol, hexanediol, 1,4-cyclohexanedimethanol, diethylene glycol, other polyethylene glycols and mixtures thereof.

In one embodiment of the invention, the light shaping elements comprise a binder and a light shaping agent dispersed in the binder. The light shaping elements are preferably polymeric beads. The polymeric beads are typically found in a polymer binder and the size, distribution, and density control the amount of the light shaping. Beads can be spherical or aspherical. How thick a polymer the beads are coated in can alter the amount of light shaping.

Using these light shaping elements and binder, the amount of light shaping and how dark the projected area (when used with a diffusion film and a projection system) through projection film on the screen can be easily tailored. Beads in a binder can also tailor light diffusion characteristics in a backlit display, for example an LCD.

As the resin of the light shaping layer, thermosetting resins such as thermosetting urethane resins consisting of acrylic polyol and isocyanate prepolymer, phenol resins, epoxy resins, unsaturated polyester resins or the like, and thermoplastic resins such as polycarbonates, thermoplastic acrylic resins, ethylene vinyl acetate copolymer resins or the like may be included.

As the light shaping element contained in the light shaping layer, synthetic resin beads such as polymethyl methacrylate (PMMA) beads, silicone beads, styrene beads or the like can be used alone or in any combination thereof.

The particle size of the bead, which is determined properly relative. to the thickness of the light shaping element, may be an average particle size of 1 to 30 micrometers and preferably has a narrow distribution. The light shaping element, when used for diffusion, increases the light diffusibility by at least the part of the particles thereof protruding from the surface of the light shaping elements. The average particle size should be in such a range that part of the particles can protrude from the surface of the light shaping elements.

Preferably, the light shaping elements comprise curved surfaces. Curved concave and convex polymer lenses have been shown to provide very efficient shaping of light and high transparency, enabling a high contrast between the projected specular areas and diffuse areas. The lenses can vary in dimensions or frequency to control the amount of diffusion achieved. A high aspect ratio lens would diffuse the light more than a flatter, lower aspect ratio lens and provide a projected darker area through the higher aspect ratio lenses (example 0.8).

In another embodiment of the invention, the light shaping elements are preferably complex lenses. Complex lenses are lenses on top of other lenses. They have been shown to provide very efficient diffusion of light and high transparency, enabling a high contrast between the projected specular areas and diffuse areas. The amount of diffusion is easily altered by changing the complexity, geometry, size, or frequency of the complex lenses to achieve the desired darkness of the diffuse areas of the projected projection media.

The plurality of lenses of all different sizes and shapes are formed on top of one another to create a complex lens feature resembling a cauliflower. The lenslets and complex lenses formed by the lenslets can be concave into the transparent polymeric film or convex out of the light management film.

One embodiment of the present invention could be likened to the moon's cratered surface. Asteroids that hit the moon form craters apart from other craters, that overlap a piece of another crater, that form within another crater, or that engulf another crater. As more craters are carved, the surface of the moon becomes a complexity of depressions like the complexity of lenses formed in the light management film.

The complex lenses may differ in size, shape, off-set from optical axis, and focal length. The curvature, depth, size, spacing, materials of construction (which determines the basic refractive indices of the polymer film and the substrate), and positioning of the lenslets determine the degree of diffusion, and these parameters are established during manufacture according to the invention.

The result of using a diffusion film having lenses whose optical axes are off-set from the center of the respective lens results in dispersing light from the film in an asymmetric manner. It will be appreciated, however, that the lens surface may be formed so that the optical axis is off-set from the center of the lens in both the x and y directions.

The lenslet structure can be manufactured on the opposite sides of the film. The lenslet structures on either side of the support can vary in curvature, depth, size, spacing, and positioning of the lenslets.

The concave or complex lenses on the surface of the polymer film are preferably randomly placed. Random placement of lenses increases the diffusion efficiency of the invention materials. Further, by avoiding a concave or convex placement of lenses that is ordered, undesirable optical interference patterns that could be distracting to the viewer are avoided.

In an embodiment of the invention, the light shaping elements are located on both sides of the light management film. By placing the light shaping elements on both sides of the support, more efficient light shaping is observed compared to the light shaping elements on one side. Both sides can be printed in registration to provide more saturated colors (as the light is transmitted through two colored and specular areas) and a darker dark as the light is transmitted through light layers of light shaping elements. The sides can be printed differently creating levels of gray and color projected for an interesting display.

Preferably, the concave or convex lenses have an average frequency in any direction of from 5 to 250 complex lenses/mm. When a film has an average of 285 complex lenses/mm, creates the width of the lenses approach the wavelength of light. The lenses will impart a color to the light passing through the lenses and add unwanted color to the projected image. Having less than 4 lenses per millimeter creates lenses that are too large and therefore diffuse the light less efficiently. Concave or convex lenses with an average frequency in any direction of between 22 and 66 complex lenses/mm are more preferred. It has been shown that an average frequency of between 22 and 66 complex lenses provide efficient light diffusion and can be efficiently manufactured utilizing cast coated polymer against a randomly patterned roll.

The light shaping elements have concave or convex lenses at an average width between 3 and 60 microns in the x and y direction. When lenses have sizes below 1 micron the lenses impart a color shift in the light passing through because the lenses dimensions are on the order of the wavelength of light and add unwanted color to the projected image. When the lenses have an average width in the x or y direction of more than 68 microns, the lenses is too large to diffuse the light efficiently. More preferred, the concave or convex lenses at an average width between 15 and 40 microns in the x and y direction. This size lenses has been shown to create the most efficient diffusion and a high level of contrast in the projected image.

The concave or convex complex lenses comprising minor lenses wherein the width in the x and y direction of the smaller lenses is preferably between 2 and 20 microns. When minor lenses have sizes below 1 micron the lenses impart a color shift in the light passing through because the lenses dimensions are on the order of the wavelength of light and add unwanted color to the projected image. When the minor lenses have sizes above 25 microns, the diffusion efficiency is decreased because the complexity of the lenses is reduced. More preferred are the minor lenses having a width in the x and y direction between 3 and 8 microns. This range has been shown to create the most efficient diffusion.

The number of minor lenses per major lens is preferably from 2 to 60. When a major lens has one or no minor lenses, its complexity is reduced and therefore it does not diffuse as efficiently. When a major lens has more than 70 minor lens contained on it, the width of some of the minor lens approaches the wavelength of light and imparts a color to the light transmitted. Most preferred are from 5 to 18 minor lenses per major lens. This range has been shown to produce the most efficient diffusion.

Preferably, the concave or convex lenses are semi-spherical meaning that the surface of each lenslet is a sector of a sphere, but not necessarily a hemisphere. This provides of excellent even diffusion over the x-y plane. The semi-spherical shaped lenses scatter the incident light uniformly, ideal for a display application where the display area needs to be diffused uniformly.

In an embodiment the substrate comprises a carbonate repeating unit. Polycarbonates have high optical transmission values compared to polyolefin polymers and therefore can improve the brightness of display devices. In another embodiment of the invention, the substrate comprises an olefin repeating unit. Polyolefins are low in cost and have good strength and surface properties. In another embodiment of the invention the substrate comprises a cellulose acetate. Tri acetyl cellulose has both high optical transmission and low optical birefringence allowing the diffuser of the invention to both diffuse light and reduce unwanted optical patterns.

The thickness of the light management film preferably is not more than 250 micrometers or more preferably from 25 to 150 micrometers. When the light management film is 25–150 micrometers thick it is easy to handle, has stability and can be processed easily through a printing apparatus. When the light management film is over 250 micrometers thick, less light is transmitted through the film causing lower contrast in the projected image. Further, by reducing the thickness of the light management film, the materials content of the light shaping elements are reduced.

Since the light management film of the invention typically is used in a projection or display systems, a light management film with an elastic modulus greater than 500 MPa is preferred. Further, because the light management film is mechanically tough, it is better able to with stand the rigors of handling and projection. A light management film with an impact resistance greater than 0.6 GPa is preferred. An impact resistance greater than 0.6 GPa allows the light management film to resist scratching and mechanical deformation.

The light management film preferably comprises voided structures. The voided structure can be throughout the entire light management film, but is preferably in a skin layer on a polymer substrate as it is easier to melt a thin layer of voids. Voided structures are less susceptible to scratches, which can affect operating performance. Also, because the voids are typically filled with air, the light management film has more of a white appearance in non-printed areas so that the content printed on the media is more easily readable (clear or colored areas on a white background) without an overhead projector. Furthermore, voided structures are easily changed during manufacturing to have different degrees of diffusion and transmission to be adapted to each overhead display system.

Microvoids of air in a polymer matrix are preferred and have been shown to be a very efficient diffuser of light and easily melted by heat and/or pressure. The microvoided layers containing air have a large index of refraction difference between the air contained in the voids (n=1) and the polymer matrix (n=1.2 to 1.8). This large index of refraction difference provides excellent diffusion and high light transmission.

An index of refraction difference between the air void and the thermoplastic matrix is preferably greater than 0.2. An index of refraction difference greater than 0.2 has been shown to provide excellent diffusion and high contrast in the projected printed projection media as well as allowing the diffusion to take place in a thin film. The diffusion elements preferably contains at least 4 index of refraction changes greater than 0.2 in the vertical direction. Greater than 4 index of refraction changes have been shown to provide enough diffusion for an overhead projection application. 30 or more index of refraction differences in the vertical direction, while providing excellent diffusion, significantly reduces the amount of transmitted light, is difficult to completely collapse leading to lower contrast of the projected images.

The substrate is preferably, a voided polymer. Microvoided substrates are preferred because the voids provide opacity without the use of $TiO_2$. They also provide cushioning during a printing process. Microvoided composite oriented sheets are conveniently manufactured by coextrusion of the core and surface layers, followed by biaxial orientation, whereby voids are formed around void-initiating material contained in the core layer. Such composite sheets are disclosed in, for example, U.S. Pat. Nos. 4,377,616; 4,758,462; and 4,632,869.

The light shaping elements are preferably a surface diffuser. A surface diffuser utilizes with its rough surface exposed to air, affording the largest possible difference in index of refraction between the material of the diffuser and the surrounding medium and, consequently, the largest angular spread for incident light and very efficient diffusion.

The light shaping elements comprising a surface microstructure are preferred. A surface microstructure is easily altered in design of the surface structures and altered in with heat and/or pressure to achieve a macro light shaping efficiency variation. Microstructures can be tuned for different light shaping and spreading efficiencies and how much they spread light. Examples of microstructures are a simple or complex lenses, prisms, pyramids, and cubes. The shape, geometry, and size of the microstructures can be changed to accomplish the desired light shaping. Surface light shaping elements utilize the rough surface exposed to air, affording the largest possible difference in index of refraction between the material and the surrounding medium (usually air) and, consequently, the, most efficient light shaping.

The light shaping elements can comprise any surface structure. The light shaping elements can form a brightness enhancement article that features a flexible, transparent base layer and two distinct surfaces, each having a topography designed to act in concert to perform the function of controlling the exit angles of light emitted from a back-lit display. The article may take several forms. The brightness enhancement film, or BEF, can be a linear array of prisms with pointed, blunted, or rounded tops. The BEF's primary job to increase the an-axis brightness from a backlight in a LCD. It achieves this by recycling light entering the film at very shallow angles to the film (this light would be otherwise wasted as it passes through the liquid crystal). The BEF can also be made up of individual optical elements that can be, for example, sections of a sphere, prisms, pyramids, and cubes. The optical elements can be random or ordered, and independent or overlapping. The sides can be sloped, curved, or straight or any combination of the three. The light shaping elements can also be retroreflective structures, typically used for road and construction signs or a Fresnel lens designed to collimate light.

In another embodiment of the invention, a bulk diffuser is preferred. A bulk diffuser can be manufactured with a macro light shaping efficiency variation, or can be subjected to heat and/or pressure to produce the variation. Further, the bulk diffuser relies on index of refraction changes through the film, not needing an air interface to work efficiently.

A light management film wherein the light shaping efficiency varies more than 5 percent in two different locations of the light management film is preferred. A light shaping efficiency that varies less than 3 percent could be caused by variations in the light management film caused by manufacturing process variations. Most preferred is a light shaping efficiency that varies more than 10 or more than 50 percent in two different locations of the film. It has been shown that over 50 percent variation in two different locations of the film produces a film that has contrast between the two diffusion efficiencies when projected with an overhead projection system. For example, a diffusion film with an efficiency variation of 60% would mean that in two locations of the film, one area could have an diffusion efficiency of 10% and another area would have a diffusion efficiency of 70%. It has been shown that over 50 percent variation in two different locations of the diffuser film produces a film that can be tailored to diffusing needs of the backlight. It has been shown that the most efficient diffuser films would have higher diffusion values near the light sources to destruct the light source shape and less diffusion away from the light source. Having a light diffuser with a macro diffusion efficiency enables the diffuser to tailor the diffusion and transmission properties as a function of location on the diffuser film.

A light management film wherein the light shaping efficiency variation comprises a gradient is preferred. Have a gradient allows for the smooth transition from bright to darker areas of a projected display and can be used in combination with color gradients. Having a gradient allows for the smooth transition from one light shaping efficiency to another light shaping efficiency. For example, in a liquid crystal display, it is desirable to have more diffusion by the light source because the light is more intense and specular in that region, however, it is not desirable for the viewer to see the transition in the diffusion film. A gradient allows that transition to be undetectable by the viewer. The light shaping efficiency of the light shaping elements can change by printing by the following mathematical variations, for example:

Light shaping efficiency=$e^{1/distance}$ or $e^{-1/distance}$
Light shaping efficiency=1/distance or −1/distance
Light shaping efficiency=distance*x or −distance*x (where x is a real number)

Each specific light shaping application determines the amount of variation needed and the rate at which efficiency changes with respect to distance.

In another embodiment of the invention, the polymer layer comprises a polyester. Polyesters are low in cost and have good strength and surface properties. Polyesters have high optical transmission values that allow for high light transmission and diffusion. This high light transmission and diffusion allows for greater differences in the bright and dark projected areas increasing contrast. In a preferred embodiment of the invention, the polyesters have a number molecular weight of from about 5,000 to about 250,000 more preferably from 10,000 to 100,000.

The polymers used in the dye-receiving elements of the invention are condensation type polyesters based upon recurring units derived from alicyclic dibasic acids (Q) and diols (L) wherein (Q) represents one or more alicyclic ring containing dicarboxylic acid units with each carboxyl group within two carbon atoms of (preferably immediately adjacent) the alicyclic ring and (L) represents one or more diol units each containing at least one aromatic ring not immediately adjacent to (preferably from 1 to about 4 carbon atoms away from) each hydroxyl group or an alicyclic ring which may be adjacent to the hydroxyl groups. For the purposes of this invention, the terms "dibasic acid derived units" and "dicarboxylic acid derived units" are intended to define units derived not only from carboxylic acids themselves, but also from equivalents thereof such as acid chlorides, acid anhydrides and esters, as in each case the same recurring units are obtained in the resulting polymer. Each alicyclic ring of the corresponding dibasic acids may also be optionally substituted, e.g. with one or more $C_1$ to $C_4$ alkyl groups. Each of the diols may also optionally be substituted on the aromatic or alicyclic ring e.g. by $C_1$ to $C_6$ alkyl, alkoxy, or halogen.

In another embodiment of the invention, the polymer layer comprises a polycarbonate. The diffusion elements formed out of polycarbonate are easily melted to form areas of specular and diffuse transmission. Polycarbonates have high optical transmission values that allow for high light transmission and diffusion. This high light transmission and diffusion allows for greater differences in the bright and dark projected areas increasing contrast.

Polycarbonates (the term "polycarbonate" as used herein means a carbonic acid and a diol or diphenol) and polyesters have been suggested for use in image-receiving layers. Polycarbonates (such as those disclosed in U.S. Pat. Nos. 4,740,497 and 4,927,803) have been found to possess good dye uptake properties and desirable low fade properties when used for thermal dye transfer. As set forth in U.S. Pat. No. 4,695,286, bisphenol-A polycarbonates of number average molecular weights of at least about 25,000 have been found to be especially desirable in that they also minimize surface deformation that may occur during thermal printing.

Polyesters, on the other hand, can be readily synthesized and processed by melt condensation using no solvents and relatively innocuous chemical starting materials. Polyesters formed from aromatic diesters (such as disclosed in U.S. Pat. No. 4,897,377) generally have good dye up-take properties when used for thermal dye transfer. Polyesters formed from alicyclic diesters disclosed in U.S. Pat. No. 5,387,571 (Daly) and polyester and polycarbonate blends disclosed in U.S. Pat. No. 5,302,574 (Lawrence et al.), the disclosure of which is incorporated by reference.

Polymers may be blended for use in the dye-receiving layer in order to obtain the advantages of the individual polymers and optimize the combined effects. For example, relatively inexpensive unmodified bisphenol-A polycarbonates of the type described in U.S. Pat. No. 4,695,286 may be blended with the modified polycarbonates of the type described in U.S. Pat. No. 4,927,803 in order to obtain a receiving layer of intermediate cost having both improved resistance to surface deformation which may occur during thermal printing and to light fading which may occur after printing. A problem with such polymer blends, however, results if the polymers are not completely miscible with each other, as such blends may exhibit a certain amount of haze. While haze is generally undesirable, it is especially detrimental for transparency receivers. Blends that are not completely compatible may also result in variable dye uptake, poorer image stability, and variable sticking to dye donors.

The polyester polymers used in the dye-receiving elements of the invention are condensation type polyesters based upon recurring units derived from alicyclic dibasic acids (Q) and diols (L) wherein (Q) represents one or more alicyclic ring containing dicarboxylic acid units with each carboxyl group within two carbon atoms of (preferably immediately adjacent to) the alicyclic ring and (L) represents one or more diol units each containing at least one aromatic ring not immediately adjacent to (preferably from 1 to about 4 carbon atoms away from) each hydroxyl group or an alicyclic ring which may be adjacent to the hydroxyl groups. For the purposes of this invention, the terms "dibasic acid derived units" and "dicarboxylic acid derived units" are intended to define units derived not only from carboxylic acids themselves, but also from equivalents thereof such as acid chlorides, acid anhydrides and esters, as in each case the same recurring units are obtained in the resulting polymer. Each alicyclic ring of the corresponding dibasic acids may also be optionally substituted, e.g. with one or more $C_1$, to $C_4$ alkyl groups. Each of the diols may also optionally be substituted on the aromatic or alicyclic ring, e.g. by $C_1$, to $C_6$ alkyl, alkoxy, or halogen.

In a preferred embodiment of the invention, the alicyclic rings of the dicarboxylic acid derived units and diol derived units contain from 4 to 10 ring carbon atoms. In a particularly preferred embodiment, the alicyclic rings contain 6 ring carbon atoms.

A dye-receiving element for thermal dye transfer comprising a miscible blend of an unmodified bisphenol-A polycarbonate having a number molecular weight of at least about 25,000 and a polyester comprising recurring dibasic acid derived units and diol derived units, at least 50 mole % of the dibasic acid derived units comprising dicarboxylic acid derived units containing an alicyclic ring within two carbon atoms of each carboxyl group of the corresponding dicarboxylic acid, and at least 30 mole % of the diol derived units containing an aromatic ring not immediately adjacent to each hydroxyl group of the corresponding diol or an alicyclic ring are preferred. This polymer blend has excellent dye uptake and image dye stability, and which is essentially free from haze. It provides a receiver having improved fingerprint resistance and retransfer resistance, and can be effectively printed in a thermal printer with significantly reduced thermal head pressures and printing line times. Surprisingly, these alicyclic polyesters were found to be compatible with high molecular weight polycarbonates.

Examples of unmodified bisphenol-A polycarbonates having a number molecular weight of at least about 25,000 include those disclosed in U.S. Pat. No. 4,695,286. Specific examples include Makrolon 5700 (Bayer AG) and LEXAN 141 (General Electric Co.) polycarbonates.

In a further preferred embodiment of the invention, the unmodified bisphenol-A polycarbonate and the polyester polymers are blended at a weight ratio to produce the desired Tg of the final blend and to minimize cost. Conveniently, the polycarbonate and polyester polymers may be blended at a weight ratio of from about 75:25 to 25:75, more preferably from about 60;40 to about 40:60.

Among the necessary features of the polyesters for the blends of the invention is that they do not contain an aromatic diester such as terephthalate, and that they be compatible with the polycarbonate at the composition mixtures of interest. The polyester preferably has a Tg of from about 40° C. to about 100° C., and the polycarbonate a Tg of from about 100° C. to about 200° C. The polyester preferably has a lower Tg than the polycarbonate, and acts as a polymeric plasticizer for the polycarbonate. The Tg of the final polyester/polycarbonate blend is preferably between 40° C. and 100° C. Higher Tg polyester and polycarbonate polymers may be useful with added plasticizer. Preferably, lubricants and/or surfactants are added to the dye receiving layer for easier processing and printing. The lubricants can help in polymer extrusion, casting roll release, and printability.

Preferably, the dye receiving layer is co-extruded. Some dye receiving layers have poor adhesion to typical substrates such as paper or polyester. Co-extruding the dye receiving layer allows for a tie layer(s) that has good adhesion to the DRL and substrate to allow for easy processability.

The light management film (lenses on the complex lens diffuser, voids in the bulk voided diffuser, or surface texture on a surface diffuser) can be altered using heat and/or pressure. The process consists of using heat and/or pressure in a gradient or pattern to produce a variable light shaping film. When heat and/or pressure is applied to the light management film, the polymer light shaping element partially or fully melts, flows, and cools to form a new structure where most or all of the light shaping element is flattened. In the case of the projection film with complex lenses as the light diffusion element, heat and/or pressure will melt the lenses (which are preferably made up of thermoplastic) and will reform to create newly shaped lenses that are shallower than the original lenses or a smooth polymer surface. This smooth polymer film allows light to pass through the printed areas specularly. Heat and/or pressure is a way to selectively turn parts diffuse parts of the projection film into partially diffuse or specular areas of the projection film and can be applied in a very precise way to create specular dots, lines, patterns, and text. Heat and/or pressure applied to a light management film with voided polymer will melt the polymer and close the voids to the extent at which the heat is applied. The voids can be partially melted and less diffuse, or melted completely creating a specular region in the bulk voided diffuser.

Preferably, a resistive thermal head applies the heat and/or pressure. The resistive thermal head, such as a print head found in a thermal printer, uses heat and pressure to melt the light shaping elements to create areas of specular transmission. As the printer prints, the printer head heats the polymer sheet and supplies pressure to deform or completely melt the light shaping elements. This process is preferred because it has accurate resolution, can create clear areas or add color at the same time as melting the lenses, and uses heats and pressures to melt a range of polymers. The resolution of the areas of light shaping, semi-light shaping and specular depends on the resolution of the print head. Preferably, color is added to the areas of specular transmission. When printing the light management film and creating areas of specular transmission, color can be added so that when projected the specular areas are colored. Transferring color while creating specular areas is advantaged because multiple colors can be added to each sheet. The color added is preferably a dye because dyes are transparent so the colored areas show up bright and colored when projected, increasing the contrast between the printed and non-printed areas. Furthermore, dyes are easily added at the same time the specular areas are created using dyes that sublimate and a thermal printer. This is advantaged because there are no registration issues between the areas of color (with dye) and the areas of specular transmission because they are created at the same time using a printing technique that is inexpensive and already supported by the printing industry. Preferably, the light management film with light shaping efficiency variation can create patterns, text, and pictures by diffusing light selectively to create areas of diffusion, less diffusion, and no diffusion (specular). This enables the creation of visually interesting and easily viewed projected images.

The gloss difference between the glossy and matte areas of the light management film after printing is preferably at least 3%. A difference of 3% can be machine read, but would not be easily visible to viewer. This makes the system ideal for a security application where information or barcodes could be imbedded into a package or substrate. When the difference is less than 2%, it becomes difficult for the difference to be measured by a typical machine. More expensive machinery would be needed to detect the small difference between the glossy and matte areas. More preferred is a gloss difference between the glossy and matte areas of the light management film after printing film of at least 10%. This difference makes the difference in the surface reflectivity easy measured by a machine and can be viewed by a person. Most preferred is a gloss difference between the glossy and matte areas of the light management film after printing of at least 50%. This difference is large enough to be detected by more simple machines and by the eye. When the difference is greater than 50%, interesting images and media can be created with the matte and glossy areas of the film.

FIG. 1 illustrates a cross section of the light management film that comprises a substrate, light shaping elements and a layer capable of receiving a dye density of at least 0.5 before printing. Substrate 2 has light shaping elements 4 on the surface of the substrate. Light shaping elements 4 has a dye receiving layer 6 on the surface of the light shaping elements.

Figure 2:
FIG. 2 illustrates a cross section of a light management film that comprises a substrate and light shaping elements that are capable of receiving a colorant density of at least 0.5.

FIG. 2 illustrates a cross section of the projection media that comprises a substrate and light shaping elements that are capable of receiving a dye density of at least 0.5 before printing. Substrate 2 has light shaping elements that are capable of receiving a dye density of at least 0.5 on the surface of the substrate 2.

Figure 3:
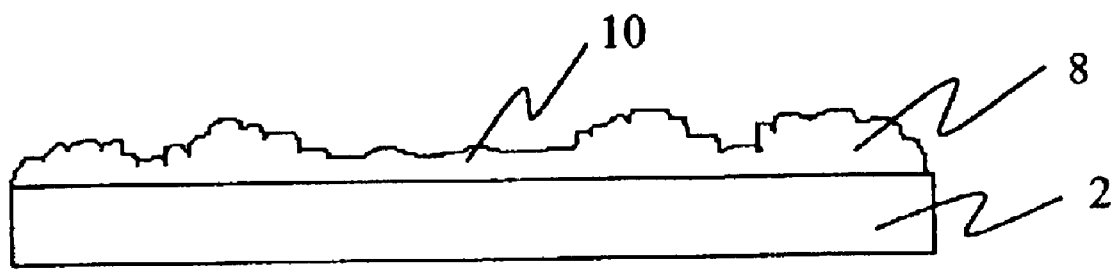
FIG. 3 illustrates a cross section of a light management film that comprises a substrate and light shaping elements that are capable of receiving a colorant density of at least 0.5 after printing.

FIG. 3 illustrates a cross section of the projection media that comprises a substrate and light shaping elements that are capable of receiving a dye density of at least 0.5 after printing. Substrate 2 has light shaping elements 8 that are capable of receiving a dye density of at least 0.5 on the surface of the substrate 2 and melted light shaping elements that are capable of receiving a dye density of at least 0.5 10 on the surface of the substrate 2.

The dye receiving layer on the light management film could be used as an inkjet receiving layer. Ink jet printing is a non-impact method for producing images by the deposition of ink droplets in a pixel-by-pixel manner to an image-recording element in response to digital signals. Continuous ink jet and drop-on-demand ink jet are examples of methods that may be utilized to control the deposition of ink droplets on the DRL to yield the desired image. Ink jet printers and media have found broad applications across markets ranging from industrial labeling to optical films to desktop document and pictorial imaging.

An ink jet recording element typically comprises a support having on at least one surface thereof an ink-receiving or image-forming layer (DRL). The ink-receiving layer may be a polymer layer that swells to absorb the ink or a porous layer that imbibes the ink via capillary action.

A binder may also be employed in the image-receiving layer in the invention. In a preferred embodiment, the binder is a hydrophilic polymer. Examples of hydrophilic polymers useful in the invention include poly(vinyl alcohol), polyvinylpyrrolidone, poly(ethyl oxazoline), poly-N-vinylacetamide, non-deionized or deionized Type IV bone gelatin, acid processed ossein gelatin, pig skin gelatin, acetylated gelatin, phthalated gelatin, oxidized gelatin, chitosan, poly(alkylene oxide), sulfonated polyester, partially hydrolyzed poly(vinyl acetate-co-vinyl alcohol), poly(acrylic acid), poly(1-vinylpyrrolidone), poly(sodium styrene sulfonate), poly(2-acrylamido-2-methane sulfonic acid), polyacrylamide or mixtures thereof In a preferred embodiment of the invention, the binder is gelatin or poly(vinyl alcohol).

If a hydrophilic polymer is used in the image-receiving layer, it may be present in an amount of from about 0.02 to about 30 g/m$^2$, preferably from about 0.04 to about 16 g/m$^2$ of the image-receiving layer.

Latex polymer particles and/or inorganic oxide particles may also be used as the binder in the DRL to increase the porosity of the layer and improve the dry time. Preferably the latex polymer particles and/or inorganic oxide particles are cationic or neutral. Examples of inorganic oxide particles include barium sulfate, calcium carbonate, clay, silica or alumina, or mixtures thereof. In that case, the weight % of particulate in the image receiving layer is from about 80 to about 95%, preferably from about 85 to about 90%.

The DRL used in the process of the present invention can also contain various known additives, including matting agents such as titanium dioxide, zinc oxide, silica and polymeric beads such as crosslinked poly(methyl methacrylate) or polystyrene beads for the purposes of contributing to the non-blocking characteristics and to control the smudge resistance thereof; surfactants such as non-ionic, hydrocarbon or fluorocarbon surfactants or cationic surfactants, such as quaternary ammonium salts; fluorescent dyes; pH controllers; anti-foaming agents; lubricants; preservatives; viscosity modifiers; dye-fixing agents; waterproofing agents; dispersing agents; UV- absorbing agents; mildew-proofing agents; mordants; antistatic agents, antioxidants, optical brighteners, and the like. A hardener may also be added to the ink-receiving layer if desired.

The support for the ink jet recording element can be any of those usually used for ink jet receivers, such as paper, resin-coated paper, polyesters, or microporous materials such as polyethylene polymer-containing material sold by PPG Industries, Inc., Pittsburgh, Pennsylvania under the trade name of Teslin®, Tyvek® synthetic paper (DuPont Corp.), and OPPalyte® films (Mobil Chemical Co.) and other composite films listed in U.S. Pat. No. 5,244,861. Opaque supports include plain paper, coated paper, synthetic paper, photographic paper support, melt-extrusion-coated paper, and laminated paper, such as biaxially oriented support laminates. Biaxially oriented support laminates are described in U.S. Pat. Nos. 5,853,965; 5,866,282; 5,874,205; 5,888,643; 5,888,681; 5,888,683; and 5,888,714, the disclosures of which are hereby incorporated by reference. These biaxially oriented supports include a paper base and a biaxially oriented polyolefin sheet, typically polypropylene, laminated to one or both sides of the paper base. Transparent supports include glass, cellulose derivatives, e.g., a cellulose ester, cellulose triacetate, cellulose diacetate, cellulose acetate propionate, cellulose acetate butyrate; polyesters, such as poly(ethylene terephthalate), poly(ethylene naphthalate), poly(1,4-cyclohexanedimethylene terephthalate), poly(butylene terephthalate), and copolymers thereof; polyimides; polyamides; polycarbonates; polystyrene; polyolefins, such as polyethylene or polypropylene; polysulfones; polyacrylates; polyetherimides; and mixtures thereof. The papers listed above include a broad range of papers, from high end papers, such as photographic paper to low end papers, such as newsprint.

In order to improve the adhesion of the DRL to the support, the surface of the support may be subjected to a corona-discharge-treatment prior to applying the DRL. In addition, a subbing layer, such as a layer formed from a halogenated phenol or a partially hydrolyzed vinyl chloride-vinyl acetate copolymer can be applied to the surface of the support to increase adhesion of the DRL. If a subbing layer is used, it should have a thickness (i.e., a dry coat thickness) of less than about 2 μm.

For the light management film of the invention, microvoided composite biaxially oriented polyolefin sheets are preferred and are manufactured by co-extrusion of the core and surface layer(s), followed by biaxial orientation, whereby voids are formed around void-initiating material contained in the core layer. For the biaxially oriented layer, suitable classes of thermoplastic polymers for the biaxially oriented sheet and the core matrix-polymer of the preferred composite sheet comprise polyolefins. Suitable polyolefins include polypropylene, polyethylene, polymethylpentene, polystyrene, polybutylene and mixtures thereof. Polyolefin copolymers, including copolymers of propylene and ethylene such as hexene, butene, and octene are also useful. Polyethylene is preferred, as it is low in cost and has desirable strength properties. Such composite sheets are disclosed in, for example, U.S. Pat. Nos. 4,377,616; 4,758,462 and 4,632,869, the disclosure of which is incorporated for reference. The projection media film comprises a polymer sheet with at least one voided polymer layer and could contain nonvoided polyester polymer layer(s). It should comprise a void space between about 2 and 60% by volume of said voided layer of said polymer sheet. Such a void concentration is desirable to optimize the transmission and reflective properties while providing adequate diffusing power to hide back lights and filaments. The thickness of the micro void-containing oriented film of the present invention is preferably about 1 micrometer to 400 micrometer, more preferably 5 to 200 micrometers.

The light management film of the invention is preferably provided with a one or more nonvoided skin layers adjacent to the microvoided layer. The nonvoided skin layers of the composite sheet can be made of the same polymeric materials as listed above for the core matrix. The composite sheet can be made with skin(s) of the same polymeric material as the core matrix, or it can be made with skin(s) of different polymeric composition than the core matrix. For compatibility, an auxiliary layer can be used to promote adhesion of the skin layer to the core. Any suitable polyester sheet may be utilized for the member provided that it is oriented. The orientation provides added strength to the multi-layer structure that provides enhanced handling properties when displays are assembled. Microvoided oriented sheets are preferred because the voids provide opacity without the use of TiO$_2$. Microvoided layers are conveniently manufactured by co-extrusion of the core and thin layers, followed by biaxial orientation, whereby voids are formed around void-initiating material contained in the thin layers.

Polyester microvoided light shaping elements are also preferred as oriented polyester has excellent strength, impact resistance and chemical resistance. The polyester utilized in the invention should have a glass transition temperature between about 50° C. and about 150° C., preferably about 60–100° C., should be orientable, and have an intrinsic viscosity of at least 0.50, preferably 0.6 to 0.9. Suitable polyesters include those produced from aromatic, aliphatic, or cyclo-aliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoiso-phthalic, and mixtures thereof. Examples of suitable glycols include ethylene glycol, propylene glycol, butanediol, pentanediol, hexanediol, 1,4-cyclohcxane-dimethanol, diethylene glycol, other polyethylene glycols and mixtures thereof. Such polyesters are well known in the art and may be produced by well-known techniques, e.g., those described in U.S. Pat. Nos. 2,465,319 and 2,901,466. Preferred continuous matrix polymers are those having repeat units from terephthalic acid or naphthalene dicarboxylic acid and at least one glycol selected from ethylene glycol, 1,4-butanediol, and 1,4-cyclohexanedimethanol. Poly(ethylene terephthalate), which may be modified by small amounts of other monomers, is especially preferred. Polypropylene is also useful. Other suitable polyesters include liquid crystal copolyesters formed by the inclusion of a suitable amount of a co-acid component such as stilbene dicarboxylic acid. Examples of such liquid crystal copolyesters are those disclosed in U.S. Pat. Nos. 4,420,607; 4,459,402; and 4,468,510.

The co-extrusion, quenching, orienting, and heat setting of polyester light management films may be effected by any process which is known in the art for producing oriented sheet, such as by a flat sheet process or a bubble or tubular process. The flat sheet process involves extruding the blend through a slit die and rapidly quenching the extruded web upon a chilled casting drum so that the core matrix polymer component of the sheet and the skin components(s) are quenched below their glass solidification temperature. The quenched sheet is then biaxially oriented by stretching in mutually perpendicular directions at a temperature above the glass transition temperature, below the melting temperature of the matrix polymers. The sheet may be stretched in one direction and then in a second direction or may be simultaneously stretched in both directions. After the sheet has been stretched, it is heat set by heating to a temperature sufficient to crystallize or anneal the polymers while restraining to some degree the sheet against retraction in both directions of stretching.

The microvoid-containing oriented film of the present invention has a function to diffuse or shape the light. A periodically varying refractive index distribution formed by these numerous microvoids and micro-lens formed by the micro voided forms a structure like a diffraction grating to contribute to the optical property to scatter the light. The voided thermoplastic diffuser sheet provides excellent scattering of light while having a high % light transmission The void-initiating particles which remain in the finished packaging sheet core should be from 0.1 to 10 micrometers in diameter, preferably round in shape, to produce voids of the desired shape and size. Voids resulting from the use of initiating particles of this size are termed "microvoids" herein. The voids exhibit a dimension of 10 micrometers or less in the unoriented thickness or Z direction of the layer. The size of the void is also dependent on the degree of orientation in the machine and transverse directions. Ideally, the void would assume a shape that is defined by two opposed and edge contacting concave disks. In other words, the voids tend to have a substantially circular cross section in the plane perpendicular to the direction of the light energy (also termed the vertical direction herein). The voids are oriented so that the two major dimensions (major axis and minor axis) are aligned with the machine and transverse directions of the sheet. The Z-direction axis is a minor dimension and is roughly the size of the cross diameter of the voiding particle. The voids generally tend to be closed cells, and thus there is virtually no path open from one side of the voided-core to the other side through which gas or liquid can traverse.

Substantially circular voids, or voids whose major axis to minor axis is between 2.0 and 0.5 are preferred as substantially circular voids have been shown to provide efficient diffusion of light energy and reduce uneven diffusion of light energy. A major axis diameter to minor axis diameter ratio of less than 2.0 is preferred. A ratio less than 2.0 has been shown to provide excellent diffusion of LC light sources. Further, a ratio greater than 3.0 yields voids that are spherical and spherical voids have been shown to provide uneven dispersion of light. A ratio between 1.0 and 1.6 is most preferred as light diffusion and light transmission is optimized.

A microvoid is a void that has a volume less than 100 micrometers. Microvoids larger than 100 micrometers are capable of diffusing visible light, however, because the void size is large, uneven diffusion of the light occurs resulting in uneven lighting of display devices. A thermoplastic microvoid volume between 8 and 42 cubic micrometers is preferred. A microvoided volume less than 6 cubic micrometers are difficult to obtain as the voiding agent is required for 6 cubic micrometers is to small to void with typical 3×3 orientation of polyester. A microvoid volume greater than 50 cubic micrometers, while providing diffusion, creates a thick diffusion layer requiring extra material and cost. The most preferred void volume for the thermoplastic diffuser is between 10 and 20 cubic micrometers. Between 10 and 20 cubic micrometers has been shown to provide excellent diffusion and transmission properties.

Methods of bilaterally orienting sheet or film material are well known in the art. Basically, such methods comprise stretching the sheet or film at least in the machine or longitudinal direction after it is cast or extruded an amount of about 1.5–10 times its original dimension. Such sheet or film may also be stretched in the transverse or cross-machine direction by apparatus and methods well known in the art, in amounts of generally 1.5–10 (usually 3–4 for polyesters and 6–10 for polypropylene) times the original dimension. Such apparatus and methods are well known in the art and are described in such U.S. Pat. No. 3,903,234.

The voids, or void spaces, referred to herein surrounding the microbeads are formed as the continuous matrix polymer is stretched at a temperature above the Tg of the matrix polymer. The microbeads of cross-linked polymer are relatively hard compared to the continuous matrix polymer. Also, due to the incompatibility and immiscibility between the microbead and the matrix polymer, the continuous matrix polymer slides over the microbeads as it is stretched, causing voids to be formed at the sides in the direction or directions of stretch, which voids elongate as the matrix polymer continues to be stretched. Thus, the final size and shape of the voids depends on the direction(s) and amount of stretching. If stretching is only in one direction, microvoids will form at the sides of the microbeads in the direction of stretching. If stretching is in two directions (bidirectional stretching), in effect such stretching has vector components extending radially from any given position to result in a doughnut-shaped void surrounding each microbead.

The preferred pre-form stretching operation simultaneously opens the microvoids and orients the matrix material. The final product properties depend on and can be controlled by stretching time-temperature relationships and on the type and degree of stretch. For maximum opacity and texture, the stretching is done just above the glass transition temperature of the matrix polymer. When stretching is done in the neighborhood of the higher glass transition temperature, both phases may stretch together and opacity decreases. In the former case, the materials are pulled apart, a mechanical anticompatibilization process.

Additional layers preferably are added to the light management film that may achieve added utility. Such layers might contain tints, antistatic materials, or different void-making materials to produce sheets of unique properties. Biaxially oriented sheets could be formed with surface layers that would provide an improved adhesion. The biaxially oriented extrusion could be carried out with as many as 10 layers if desired to achieve some particular desired property. Addenda are preferably added to a polyester skin layer to change the color of the imaging element. Colored pigments that can resist extrusion temperatures greater than 320 degrees Celsius are preferred, as temperatures greater than 320 degrees Celsius are necessary for co-extrusion of the skin layer.

Addenda of this invention could be an optical brightener. An optical brightener is substantially colorless, fluorescent, organic compound that absorbs ultraviolet light and emits it as visible blue light. Examples include but are not limited to derivatives of 4,4'-diaminostilbene-2,2'-disulfonic acid, coumarin derivatives such as 4-methyl-7-diethylaminocoumarin, 1-4-Bis(O-Cyanostyryl)Benzol and 2-Amino-4-Methyl Phenol. Optical brightener can be used in a skin layer leading to more efficient use of the optical brightener.

The light management films may be coated or treated after the co-extrusion and orienting process or between casting and full orientation with any number of coatings which may be used to improve the properties of the sheets including printability, to provide a vapor barrier, to make them heat sealable, or to improve adhesion. Examples of this would be acrylic coatings for printability, coating polyvinylidene chloride for heat seal properties. Further examples include flame, plasma or corona discharge treatment to improve printability or adhesion. By having at least one nonvoided skin on the micro-voided core, the tensile strength of the sheet is increased and makes it more manufacturable. It allows the sheets to be made at wider widths and higher draw ratios than when sheets are made with all layers voided. The non-voided layer(s) can be peeled off after manufacture of the film. Co-extruding the layers further simplifies the manufacturing process.

The light management film of the present invention may be used in combination with a film or sheet made of a transparent polymer. Examples of such polymer are polyesters such as polycarbonate, polyethylene terephthalate, polybutylene terephthalate and polyethylene naphthalate, acrylic polymers such as polymethyl methacrylate, and polyethylene, polypropylene, polystyrene, polyvinyl chloride, polyether sulfone, polysulfone, polyarylate and triacetyl cellulose. The projection media may be mounted to a glass sheet for support.

The light management film of the present invention may be incorporated with e.g. an additive or a lubricant such as silica for improving the drawability and the surface-slipperiness of the film within a range not to deteriorate the optical characteristics to vary the light-scattering or shaping property with an incident angle. Examples of such additive are organic solvents such as xylene, alcohols or ketones, fine particles of an acrylic resin, silicone resin or A metal oxide or a filler.

The light management film may be coated or treated before or after thermoplastic casting or forming with any number of coatings which may be used to improve the properties of the sheets including printability, to provide a vapor barrier, to make them heat sealable, or to improve adhesion. Examples of this would be acrylic coatings for printability, coating polyvinylidene chloride for heat seal properties. Further examples include flame, plasma or corona discharge treatment to improve printability or adhesion.

The light management film of the invention may also be used in conjunction with a light diffuser, for example a bulk diffuser, a lenticular layer, a beaded layer, a surface diffuser, a holographic diffuser, a micro-structured diffuser, another lens array, or various combinations thereof. The lenslet diffuser film disperses, or diffuses, the light, thus destroying any diffraction pattern that may arise from the addition of an ordered periodic lens array. The light management film may also be used in an application with more than one sheet of the light management film stacked, or with any other optical film including brightness enhancement films, retroreflective films, waveguides, and diffusers.

The light management film of the invention can also include, in another aspect, one or more optical coatings to improve optical transmission through the film. It is often desirable to coat a layer of an anti-reflective (AR) coating in order to raise the efficiency of the light management film.

It is preferred to use the process of extrusion polymer coating to create the light shaping elements. It is known to produce polymeric film having a resin coated on one surface thereof with the resin having a surface texture. This kind of transparent polymeric film is made by an extrusion polymer coating process in which raw (uncoated) polymeric film is coated with a molten resin, such as polycarbonate. The polymeric film with the molten resin thereon is brought into contact with a chill roller having a surface pattern. Chilled water is pumped through the roller to extract heat from the resin, causing it to solidify and adhere to the polymeric film. During this process the surface texture on the chill roller's surface is imprinted into the resin coated polymeric film. Thus, the surface pattern on the chill roller is critical to the surface produced in the resin on the coated transparent polymeric film.

Light shaping features that are dye receiving layers can also be fabricated from the melt of the polymers of this invention. Rather than dissolving the polymer in a solvent that will have to be removed later, the fluid polymer melt is squeezed out of a thin die and onto the support that moves through the melt curtain. Similarly, these polymers may be extruded simultaneously with other polymer melts in a process of coextrusion. The layers coextruded with these polymers could be the backing, support, intermediate layers, or overcoat for the dye receiver layer. In the simplest case, the polymers of this invention may be extruded thick enough to serve as both support and receiver layer to yield a single step manufacturing process. Extrusion and coextrusion techniques are well known in the art and are described, e.g., in Encyclopedia of Polymer Science and Engineering, Vol. 3, John Wiley, New York, 1985, p. 563, and Encyclopedia of Polymer Science and Engineering, Vol. 6, john Wiley, New York, 1986, p. 608, the disclosures of which are incorporated by reference.

A method of fabricating the light management film assembly was developed. The preferred approach comprises the steps of providing a positive master chill roll having the inverse of the desired surface morphology. The light management film is replicated from the master chill roller by casting a molten polymeric material to the face of the chill roll and transferring the polymeric material with lenslet structures onto a polymeric film creating the desired morphology on the film.

A chill roller is manufactured by a process including the steps of electroplating a layer of cooper onto the surface of a roller, and then abrasively blasting the surface of the copper layer with beads, such as glass or silicon dioxide, to create a surface texture with hemispherical features. The resulting blasted surface is bright nickel electroplated or chromed to a depth that results in a surface texture with the features either concave into the roll or convex out of the roll. Because of the release characteristics of the chill roll surface, the resin will not adhere to the surface of the roller. The surface of the roller can also be subjected to any process to create the desired pattern on the roll such as diamond cutting, laser ablating, or photolithography.

The bead blasting operation (to create lenses or complex lens surface geometry) is carried out using an automated direct pressure system in which the nozzle feed rate, nozzle distance from the roller surface, the roller rotation rate during the blasting operation and the velocity of the particles are accurately controlled to create the desired lenslet structure.

The number of features in the chill roll per area is determined by the bead size and the pattern depth. Larger bead diameters and deeper patterns result in fewer numbers of features in a given area. Therefore the number of features is inherently determined by the bead size and the pattern depth.

Preferably, the light shaping elements are formed using the process of solvent coating. The coating can be applied to one or both substrate surfaces through conventional pre-metered or post-metered solvent coating methods such as blade, air knife, rod, roll coating etc. The choice of coating process would be determined from the economics of the operation and in turn, would determine the formulation specifications such as coating solids, viscosity, and speed. The coating processes can be carried out on a continuously operating machine wherein a single layer or a plurality of layers is applied to the support. Solvent coating is preferred because it is roll to roll and the polymers can be coated with as many as 15 different layers at once.

The light management film of the invention may also be manufactured by vacuum forming around a pattern, injection molding or embossing a polymer web.

The light management film can be transformed into a reflection film or a transflector film by applying a reflection layer composed of a metallic film, etc., to the film of the present invention to be used e.g. as a retroreflective member for a traffic sign. It can be used in a state applied to a car, a bicycle, person, etc. When the printed light management film is placed on a metallic film, it can cause the amount of reflection and diffusion reflection and light shaping to vary across the film from diffuse or light shaping to almost specular. This can create a reflection sign with sections diffuse and sections (such as text) as a mirror surface. The surface of the light management film can also be partially metallized as to create a variable diffusion transflector, an optical film in a LCD so that the LCD can be used in both reflection and transmission mode.

The light management film of the present invention also has significant architectural uses such as providing appropriate light for work and living spaces. In typical commercial applications, inexpensive light management films are used to help diffuse light over the room or direct light.

The present invention has a significant use as a light source destructuring device. In many applications, it is desirable to eliminate from the output of the light source itself the structure of the filament that can be problematic in certain applications because light distributed across the sample will vary and this is undesirable. Also, variances in the orientation of a light source filament or are after a light source is replaced can generate erroneous and misleading readings. A light management film of the present invention placed between the light source and the detector can eliminate from the output of the light source any trace of the filament structure and therefore causes a homogenized output which is identical from light source to light source.

The light management films of the present invention may also be used in the area of law enforcement and security systems to homogenize the output from laser diodes (LDs) or light emitting diodes (LEDs) over the entire secured area to provide higher contrasts to infrared (IR) detectors. The films of the present invention may also be used to remove structure from devices using LED or LD sources such as in bank note readers or skin treatment devices. This leads to greater accuracy.

The light management films of the present invention may also be used to diffusely light illuminating artwork. The light management film provides a suitable appropriately sized and directed aperture for depicting the artwork in a most desirable fashion.

Further, the light management film of the present invention can be used widely as a part for an optical equipment such as a displaying device. For example, it can be used as a light-reflection plate laminated with a reflection film such as a metal film in a reflective liquid crystal display device or a front scattering film directing the film to the front-side (observer's side) in the case of placing the metallic film to the back side of the device (opposite to the observer), in addition to the aforementioned light-scattering plate of a backlight system of a liquid crystal display device. The light management film of the present invention can be used as an electrode by laminating a transparent conductive layer composed of indium oxide represented by ITO film. If the material is to be used to form a reflective screen, e.g. front projection screen, a light-reflective layer is applied to the transparent polymeric film diffuser.

Another application for the light management film is a rear projection screen, where it is generally desired to project the image from a light source onto a screen over a large area. The viewing angle for a television is typically smaller in the vertical direction than in the horizontal direction so variable diffusion across the display can control the viewing angle and brightness across the display.

The invention can be utilized to introduce color into a monochromatic display. Color to a monochromatic display can increase its value to the consumer. In a cell phone, for instance, the light management film could be printed so that the number dialed was always green and the battery indicator was always red. This invention can also be used for branding. If a company wanted their brand name on the display, they could have their name or symbol printed so that when ever the display was on, the logo was displayed. Because the invention can be printed on-demand, each light management film can be printed differently. Names or pictures could be added to a cell phone for added security against theft because the thief would have to dismantle the entire display to get at the light management film most likely breaking it. The light management film adds color to a display without adding another film to the display stack (which adds weight and cost) because color is added to a light management film already in the stack (such as a diffuser, brightness enhancement film, or reflective film).

Embodiments of the invention may provide improved increased contrast overhead projection displays, barcode systems, but also unique and interesting display media.

The entire contents of the patents and other publications referred to in this specification are incorporated herein by reference.

EXAMPLE

In this example, the light management film of the invention was created by extrusion coating polyester against a patterned chill roll containing complex lens geometry. The light shaping elements were complex lenses that were capable of receiving a dye density of at least 0.5. The patterned polyester, in the form the complex lens, was then transferred to a polyester web material thereby forming a light management film that could be used as a projection material with light diffusion elements in the form of complex surface lenses, light shaping film, or variable diffuser film. This example will show that the complex lenses made of a dye receiving material formed on a transparent polymer web material and selective melting of the lenses and added coloration will produce a printed projection media or useful optical film. Further, the light management film will be simply made and printed, low in cost, and will have mechanical properties that allow for use in overhead projection systems and display systems.

A patterned chill roll was manufactured by a process including the steps abrasively blasting the surface of the chill roll with grit (can be glass or other materials) to create a surface texture with hemispherical features. The resulting blasted surface was chromed to a depth that results in a surface texture with the features either concave into the roll or convex out of the roll. The bead blasting operation was carried out using an automated direct pressure system in which the nozzle feed rate, nozzle distance from the roller surface, the roller rotation rate during the blasting operation and the velocity of the particles are accurately controlled to create the desired complex lens structure. The number of features in the chill roll per area is determined by the bead size and the pattern depth. Larger bead diameters and deeper patterns result in fewer numbers of features in a given area.

The complex lens patterned roll was manufactured by starting with a steel roll blank and grit blasted with size 14 grit at a pressure of 447 MPa. The roll was then chrome platted. The resulting complex lenses on the surface of the roll were convex.

The polyester used in this invention was derived from 1,4-cyclohexanedicarboxylic acid, ethylene glycol (50 mole percent) and 4,4'-bis(2-hydroxyethyl)bisphenol-A (50 mole percent).

This polymer was synthesized using a standard melt condensation of a 70:30 cis:trans mixture of dimethyl 1,4-cyclohexane dicarboxylate with 4,4'-bis(2-hydroxyethyl) bisphenol-A and an excess of ethylene glycol.

To a single neck side-arm 500 mL polymerization flash fitted with a 38 cm head was added dimethyl 1,4-cyclohexane dicarboxylate (104. 8 g, 0. 54 mol), 4,4'-bis(2-hydroxyethyl)bisphenol-A (84.5 g, 0.27 mol), ethylene glycol (60.4 g, 1.1 mol), zinc acetate dihydrate (0.4 g), antimony trioxide (0.3 g), and Irganox 1010 (Ciba Geigy) (0.25 g). The flask was heated to 220.degree. C. in a salt bath and continuously flushed with nitrogen for distillation of methanol. After two hours the calculated amount of methanol had been distilled and the temperature was raised to 240.degree. C. for 30 minutes. Trioctylphosphate (8 drops) was added and the temperature was increased to 275.degree. C.

The flask was reconfigured for mechanical stirring and evacuation. The pressure was slowly reduced to 0.4 mm mercury over 15 minutes to allow excess ethylene glycol to distill. The progress of the reaction was monitored by measuring the power required to maintain a constant torque of 200 rpm. The reaction was terminated when the power required reached 180 mv. The flask was cooled to room temperature, rinsed with water and then was broken to remove the polymer ball. The polymer was cooled to liquid nitrogen temperature, broken into centimeter-sized pieces and ground in a Wiley Mill. The yield of polymer was 172 g, the Tg was 51.6° C., and the number average molecular weight by size exclusion chromatography was 30,700.

The polyester extrusion coated samples were prepared by feeding pre-dried polyester used in the invention (45° C. for 24 hours prior to extrusion coating) to a Brebender extruder heated to 175° C. to melt the polymer. The molten polymer was pushed out of the extruder die (coat hanger slot die) and applied to corona discharge treated polyester web (100 micrometer transparent oriented web polyester web with a light transmission of 90.2% with adhesion coatings.) The polymer structure was pressed between a rubber roller at the back of the polyester web and the patterned chill roller held at 15° C. that contacted the polyester polymer that had been laid on the polyester web. The polyester cast coating coverage was 25.88 g/m$^2$. The resulting structure was polyester complex lens on a polyester web.

The invention materials contained complex lenses with randomly distributed lenses comprising a major lens with an average diameter of 27.1 micrometers and minor lenses on the surface of the major lenses with an average diameter of 6.7 micrometers. The average minor to major lens ratio was 17.2 to 1. The structure of the cast coated light management film is as follows,

| |
| --- |
| Formed polyester lenses |
| Transparent polyester base |

The light management film was them post-manufacture printed adding color and changing the diffusivity of the complex lenses selectively. The film was printed using thermal printing with thermal dye sublimation, Kodak model 8670 PS Thermal Printer. The thermal print head applied heat and pressure to melt the lenses. When they cool back below the glass transition temperature, they harden in the new flatter state. The heat and pressure melt the lenses causing an almost completely specular transmission area in the film and, at the same time color the specular areas. One printed feature was specular text in size fonts from size 6 to size 30 in the Times New Roman Font that was colored red. Another feature was a group of filled in 0.5 cm specular squares that were black. The third feature printed was a specular grid structure that was colored green. Though these features were chosen, any feature (such as text, lines, or graphics) could have been used and colored or left clear.

The printed light management film from above were measured for % light transmission and % diffuse light transmission, diffuse light transmission efficiency, a*, and b*. a* is a measure of the redness or greenness and is expressed as single number, which is positive if the color is red and negative if the color is green. Similarly, yellowness or blueness is expressed by b*, which is positive for yellow and negative for blue. The larger the absolute value is for the a* and b*, the more colored the film is. The a* and b* values of the films were measured using a CIElab colorimeter with an 1964 observer and a D65 illuminate.

The diffuse areas of the printed light management film were measured with the Hitachi U4001 UV/Vis/NIR spectrophotometer equipped with an integrating sphere. The total transmittance spectra were measured by placing the samples at the beam port with the front surface with complex lenses towards the integrating sphere. A calibrated 99% diffusely reflecting standard (NIST-traceable) was placed at the normal sample port. The diffuse transmittance spectra were measured in like manner, but with the 99% tile removed. All spectra were acquired between 350 and 800 nm. As the diffuse reflectance results are quoted with respect to the 99% tile, the values are not absolute, but would need to be corrected by the calibration report of the 99% tile.

Percentage total transmitted light refers to percent of light that is transmitted though the sample at all angles. Diffuse transmittance, is defined as the percent of light passing though the sample excluding a 2.5 degree angle from the incident light angle. The diffuse light transmission is the percent of light that is passed through the sample by diffuse transmittance. The term "diffusion efficiency" and "haze" means the ratio of % diffuse transmitted light at 500 nm to % total transmitted light at 500 nm multiplied by a factor of 100, as known as haze in the art. Diffuse reflectance is defined as the percent of light reflected by the sample. The percentages quoted in the examples were measured at 500 nm. These values may not add up to 100% due to absorbencies of the sample or slight variations in the sample measured.

The color patches and unprinted area of the light management film were measured for 60-degree gloss using a Gardner Gloss Meter at an angle of illumination/reflection of 60° according to the ASTM D523 standard. The measured values for the invention are listed in Table 1 below.

TABLE 1

| Projection Media (After Printing) | Diffuse Areas | Specular Red Text | Specular Black Squares | Specular Green Grid |
|---|---|---|---|---|
| Total transmission | 85.2% | 87.5% | 90.2% | 88.7% |
| Diffuse transmission efficiency at 500 nm | 85.7% | 13.1% | 12.7% | 13.0% |
| a* | 0.7 | 50.1 | 0.2 | −38.3 |
| b* | 1.0 | 2.4 | 42.9 | 4.1 |
| 60° Gloss | 12.8 | 101.0 | 116.2 | 85.5 |
| Status A Blue Density-Dmax | | | 2.2 | |

As the data above clearly indicates, the light management film with complex polymer lenses as light diffusing elements formed out of polyester on the surface of a polyester web provided vivid colors as well as large differences in the diffusion efficiencies and gloss of the printed and non-printed areas.

The polyester complex lenses are a good dye receiving layer, receiving a dye density (Dmax) of 2.2. The high levels of dye density achieved enables rich saturated colors to be printed on the light management film. This is evident in the saturated colors produced and the large absolute values of a* and b*. The large difference in diffuse transmission efficiency or haze (85.7% of the unprinted to an average of 12.9% for the printed areas) indicates that when the light management film was printed, substantially al of the complex lenses in the areas that were printed were flattened. When using the light management film as a projection media, a large difference in haze correlates to a large contrast difference between the printed and non-printed areas of the light management film. The large difference in surface gloss leads to easy scanning of a collimated light source and a detector for surface gloss.

When projected, the high diffusion efficiency of the un-printed areas (85.7%) translated into a dark gray projected area. The colored areas (text, squares, and a grid) displayed as bright colored areas when projected because of their a*, b* values and their low diffusion efficiency values (12.7–13.1%). When the printed projection media was projected using a standard overhead projection system the image projected was high in contrast and easily viewed and read with the surrounding room lighting on.

As the data above clearly indicates, the variable diffusion complex polymer lenses formed on the surface of a transparent polymer provides tailored variable light diffusion and % transmission allowing for brighter liquid crystal display devices. For example, the light management film could have a gradient of light shaping or diffusion where the percent total light transmission increased and diffuse light transmission decreased from the center of the roll to the edge of the roll. This would be for a display that had a light source in the center of the display and therefore needed more diffusion in that area. This film is more diffuse and less transparent in the center of the display where the light is located, to compensate for the light intensity of the light bulb. Towards the edge of the film and display, away from the light source, more light passes through the film and the light is diffused less to create an even light intensity across the entire display. This tailoring of the diffusion film to the back lit display enables a brighter display. The diffuser with tailored of total and diffuse transmission of the roll across the roll can deliver more light intensity and more uniform light to the viewer. The complex lenses and other light shaping elements are well suited to be tailored either pre post manufacture to obtain this tailored, variable light management film.

The difference in gloss allows for easy readability by a barcode reading system. One such system might include a laser and a detector to measure how of the light is reflected off of the surface diffusely and specularly. By using how the light is reflected, the surface of the barcode needs to vary, but the coloration does not. Barcodes using the light reflection can be colorless and placed over other information on the label, such as pictures or nutritional information. Because the barcode is not a large black and white printed area, it saves space on a label and makes the appearance of the package more attractive. The barcode system would work by measuring surface reflectivity (gloss versus matte), and can be used with both reflective and transparent labels and packages.

The light management film of the present invention can display text, shapes, and images in varying amounts of diffusion and light shaping and different colors to create visually interesting and easily readable overheads, improved brightness backlight systems, and more attractive barcodes.

Further, because the invention materials were constructed on an oriented polyester base, the materials have a higher elastic modulus compared to cast sheets. The oriented polymer base of the example allow for the light management film to be thin and therefore cost efficient and light as the materials content of the example materials is reduced compared to prior art materials.

While this example was primarily directed toward the use of overhead projection media, back light display, and barcodes, the light management film of the invention can be used as imaging elements containing a diffusion layer or other optical film, diffuser for an automobile light, a diffuser for specular home lighting and privacy screens, imaging media, and greenhouse light diffusion.

PARTS LIST

2 Substrate
4 Light shaping elements
6 Dye receiving layer
8 Light shaping elements that are capable of receiving a dye density of at least 0.5
10 Melted light shaping elements that are capable of receiving a dye density of at least 0.5

What is claimed is:

1. A light management polymeric film with total light transmission of 80% or greater at 500 nm containing a substrate, light shaping elements with a roughness average of at least 3 micrometers, and a layer capable of receiving a colorant density of at least 0.5.

2. The light management film of claim 1 wherein the layer capable of receiving a colorant density is capable of receiving a dye density of at least 1.5.

3. The light management film of claim 1 wherein the light shaping elements have a roughness average of at least 6 micrometers.

4. The light management film of claim 1 wherein said light shaping elements are located between said substrate and said layer capable of receiving a dye density of at least 0.5.

5. The light management film of claim 1 wherein the light shaping elements have an aspect ratio of between 0.1 and 1.0.

6. The light management film of claim 1 wherein the light shaping elements contain titanium dioxide particles of lateral dimension less than 30 nanometers.

7. The light management film of claim 1 wherein the light shaping elements comprise a polymer.

8. The light management film of claim 1 wherein the light shaping elements comprise polymeric beads.

9. The light management film of claim 1 wherein the light shaping elements comprise curved surfaces.

10. The light management film of claim 1 wherein the light shaping elements comprise complex lenses.

11. The light management film of claim 1 wherein the light shaping elements comprise voided structures.

12. The light management film of claim 1 wherein the light shaping elements comprise brightness enhancement features.

13. The light management film of claim 1 wherein the light shaping elements comprise prisms.

14. The light management film of claim 1 wherein the light shaping elements have a Tg of less than 75° C.

15. The light management film of claim 1 wherein the light shaping elements comprise a UV curable polymer.

16. The light management film of claim 1 wherein the light shaping elements comprise a UV fluorescing agent.

17. The light management film of claim 1 wherein the light shaping elements comprise dye or pigment.

18. The light management film of claim 1 wherein the light management film has a haze of at least 70%.

19. The light management film of claim 1 wherein the substrate exhibits light transmission of at least 85%.

20. The light management film of claim 1 wherein the substrate comprises a voided polymer.

21. The light management film of claim 1 wherein the light management film further comprises a pressure sensitive adhesive.

22. The light management film of claim 1 wherein the light management film, when projected, has a contrast level of at least 300:1.

23. The light management film of claim 1 comprising specular areas of transmission.

24. The light management film of claim 1 wherein the light shaping elements are capable of receiving a dye density of at least 0.5.

25. The light management film of claim 24 wherein the light shaping elements comprise polyester.

26. The light management film of claim 24 wherein the light shaping elements comprise a blend of polyester and polycarbonate.

27. The light management film of claim 24 wherein the light shaping elements comprise unmodified bis-phenol-A polycarbonate and a polyester comprising recurring dibasic acid derived units and diol derived units.

28. The light management film of claim 26 wherein the blend of polyester and polycarbonate is in a weight ratio of between 75:25 and 25:75.

29. The light management film of claim 24 wherein the light shaping elements have a glass transition temperature of between 40 and 100 degrees Celsius.

30. A process for writing on a light management film of claim 1 comprising applying heat and/or pressure to selectively create areas of specular transmission.

31. The process of claim 30 wherein the heat and/or pressure is applied by a resistive thermal head.

32. The process of claim 30 wherein heat is applied by a laser beam.

33. The process of claim 30 wherein the process for writing on a light management film comprises adding color to the areas of specular transmission.

34. The process for forming the light shaping elements of claim 1 comprising extrusion polymer coating.

35. The process for forming the light shaping elements of claim 1 comprising solvent polymer coating.

36. A light management film containing a substrate that exhibits light transmission of at least 85%, light shaping elements with a roughness average of at least 6 micrometers wherein the light shaping elements comprise prisms, and a layer capable of receiving a colorant density of at least 0.5.

* * * * *